(No Model.)
W. J. OSWALD.
FAUCET.
No. 519,508. Patented May 8, 1894.
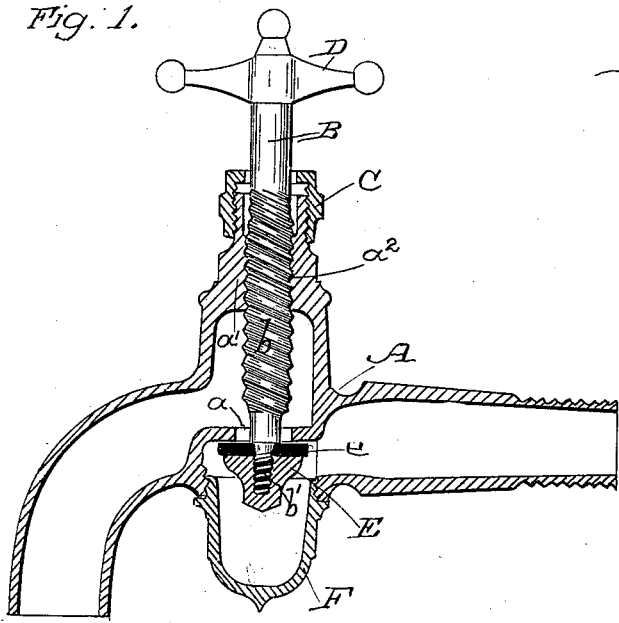
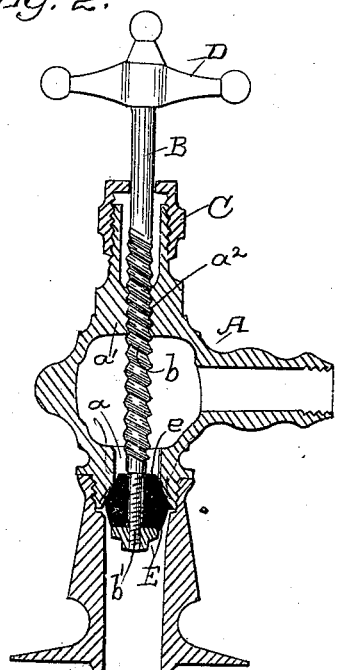
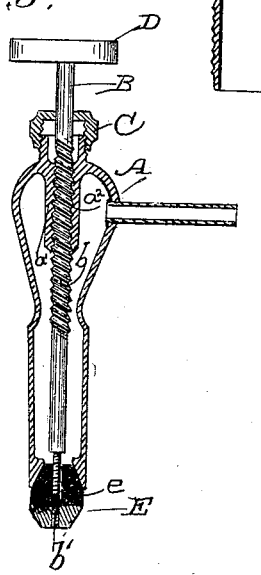
Witnesses,
[signature]
J. A. Bayless
Inventor.
William J. Oswald
By Dewey & Co.
Attys

UNITED STATES PATENT OFFICE.

WILLIAM J. OSWALD, OF SAN JOSÉ, CALIFORNIA.

FAUCET.

SPECIFICATION forming part of Letters Patent No. 519,508, dated May 8, 1894.

Application filed February 4, 1893. Serial No. 461,049. (No model.)

*To all whom it may concern:*

Be it known that I, WILLIAM J. OSWALD, a citizen of the United States, residing at San José, Santa Clara county, State of California, have invented an Improvement in Faucets; and I hereby declare the following to be a full, clear, and exact description of the same.

My invention relates to the class of faucets. It consists essentially in a suitable faucet pipe or barrel, a valve stem having screw-threads whereby it is seated and movable in said pipe or barrel, and a valve adapted to control the passage of the faucet, and seated upon the stem by screw-threads, the reverse of those by which the stem is seated in the pipe or barrel.

Referring to the accompanying drawings for a more complete explanation of my invention,—Figure 1 is a longitudinal vertical section of my invention as embodied in a type of faucet termed a common bib. Fig. 2 is a vertical section showing the embodiment of the invention in a basin cock. Fig. 3 is a section showing it in an oil faucet.

In Fig. 1, the pipe or barrel A of the ordinary bib, has a passage $a$, and an upwardly projecting seat $a'$. This seat is internally threaded as shown at $a^2$, and in it is screwed the stem B having the threads at $b$. The projection of the stem from the seat is guarded by the usual gland nut C, and said stem has a suitable handle D on its top. The stem, at its lower end, has the threads $b'$ and these are the reverse in direction of those at $b$. Upon threads $b'$ is screwed the valve E which opens and closes the passage $a$. When the valve is closing after it has made contact with its seat, the lower end of the stem screws into it owing to the direction of the threads thereon, and the packing will be compressed but on reversing the movement of the spindle its lower threaded end will unscrew from the valve faster than its packing will expand; hence the valve will be forced from its seat earlier than it would if the packing expanded suddenly to its full thickness and remained for any length of time in contact with its seat. It is evident that the valve will not screw off of the stem in opening as far as it is screwed thereon in closing. The tendency therefore will be for the valve to work on the stem rather than to work off as would be the case if the lower threads proceeded in the same direction as the upper threads.

In the arrangement shown it is best to have the threads $b$ left handed, and those at $b'$ right handed, whereby the turning of the stem to close and open the faucet will be in the customary directions.

In Fig. 2, where the type of basin cock is used, precisely the same arrangement of the invention is shown, and I have consequently designated the parts by the same letters which will need no further description. The same is true of the oil faucet, shown in Fig. 3.

The several and more common forms are illustrated in order to show the applicability of my invention to any faucet, as I do not wish to be confined to any particular form. It will be well to notice, however, the following points, namely, first, that in the form shown in Fig. 1 where the movement of the stem is at right angles or crosswise of the pipe or barrel, the lower or cap nut F is made sufficiently deep to permit the required movement or play of the valve; second, that the valve may be of character suitable to the uses of the faucets; thus, where used for water, a suitable washer, such as $e$, in Fig. 1, will be employed.

Having thus described my invention, what I claim as new, and desire to secure by Letters Patent, is—

1. A faucet comprising a barrel provided with a valve seat, a coarsely threaded spindle or stem extending down through the upper side of the faucet barrel and through the valve seat opening and provided with oppositely extending threads on its lower end below the valve seat and of finer pitch than the first named threads, and a valve head having a threaded aperture or recess receiving said lower threaded end and a packing disk on its upper face, the said valve head closing upwardly against the valve seat and accessible from the lower portion of the faucet for repair or replacement, substantially as herein described.

2. A faucet consisting in a barrel A having a transverse valve seat $a$, a removable cup-like plug in the lower side of the barrel below the valve seat, a coarsely threaded stem B extending down through an opening $a^2$ in the top of the barrel and through the valve seat opening, and having a reduced lower end provided with threads of finer pitch, and the upwardly closing valve head E inserted through the opening in the lower side of the barrel, and having a threaded aperture receiving the threaded lower end of the stem and a packing disk on its upper face, substantially as herein described.

In witness whereof I have hereunto set my hand.

WILLIAM J. OSWALD.

Witnesses:
S. H. NOURSE,
GEO. H. STRONG.